(12) United States Patent
Kang et al.

(10) Patent No.: US 6,445,426 B1
(45) Date of Patent: Sep. 3, 2002

(54) TOUCH PANEL DEVICE

(75) Inventors: Min-Goo Kang, Pusan; Ki-Hwan Kim, Taegoo, both of (KR)

(73) Assignee: Samsung SDI Co., Ltd., Suwon (KR)

( * ) Notice: Subject to any disclaimer, the term of this patent is extended or adjusted under 35 U.S.C. 154(b) by 69 days.

(21) Appl. No.: 09/692,610

(22) Filed: Oct. 18, 2000

(30) Foreign Application Priority Data

Oct. 18, 1999 (KR) ................................................ 9945108

(51) Int. Cl.[7] .............................................. G02F 1/1333

(52) U.S. Cl. ........................................ 349/12; 345/174

(58) Field of Search ............................ 349/12; 345/173, 345/174

(56) References Cited

U.S. PATENT DOCUMENTS 5,589,857 A * 12/1996 Tanahashi et al. .......... 345/174
6,151,013 A * 11/2000 Huang ........................ 345/174
6,307,166 B1 * 10/2001 Watanabe et al. ........... 345/173

* cited by examiner

*Primary Examiner*—James Dudek (57) ABSTRACT

A touch panel device which is adapted for varying resistance values between the electrodes is disclosed. The touch panel device has a upper conductive layer formed on the top plate, having a pair of first electrodes, a lower conductive layer formed on the base plate, having a pair of second electrodes and a plurality of dot spacers, located in between said upper conductive layer and lower conductive layer. At least either one of the upper conductive layer and the lower conductive layer has a plurality of through holes formed thereon, so that a resistance between the electrodes can be varied by varying dimensions of the through holes and intervals between the through holes.

6 Claims, 6 Drawing Sheets

TOUCH PANEL DEVICE

BACKGROUND OF THE INVENTION (a) Field of the Invention

The present invention relates to touch panel devices, and more particularly, to touch panel devices having a conductive layer with a plurality of through holes to vary resistance between the electrodes for specific applications.

(b) Description of the Related Art

Generally, a touch panel is formed by laminating transparent upper and lower conductive layers with a spacer such as a dot spacer interposed therebetween. The touch panel thus formed is mounted on a display surface of a display device such as a CRT or LCD (liquid crystal display), and is depressed at a predetermined position by means of a pen, a finger, etc. as viewed by an operator to detect a coordinate at such a depressed position.

Figure 8:
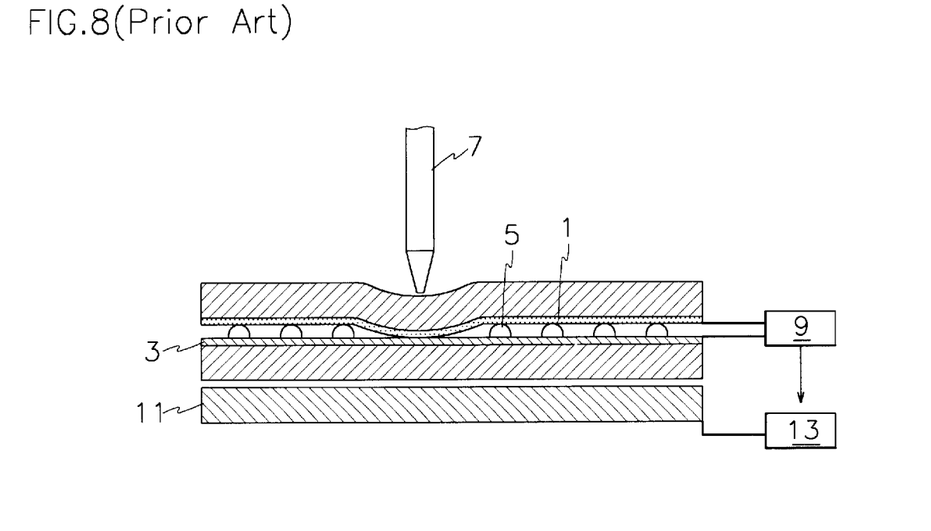
FIG. 8 shows a sectional view of a touch panel device according to a prior art.

According to a touch panel of a prior art, as shown in FIG. 8, a pair of transparent conductive layers 1 and 3 are disposed to be opposite each other with a certain gap therebetween by a plurality of dot spacers 5. Electrical switching is effected by applying a pen 7, finger or other pressure to a specific location of the layer 1 to make a contact with the layer 3.

When electrically switched on the specific location, a controller 9 detects a voltage which is varied by a resistance of the specific location. The voltage signal is converted into a digital signal by an analog-to-digital converter of the controller 9, resulting in a coordinate position signal. The coordinate position signal is provided to a CPU, which is connected to a display device such as LCD or CRT, to drive the display device.

Figure 9:
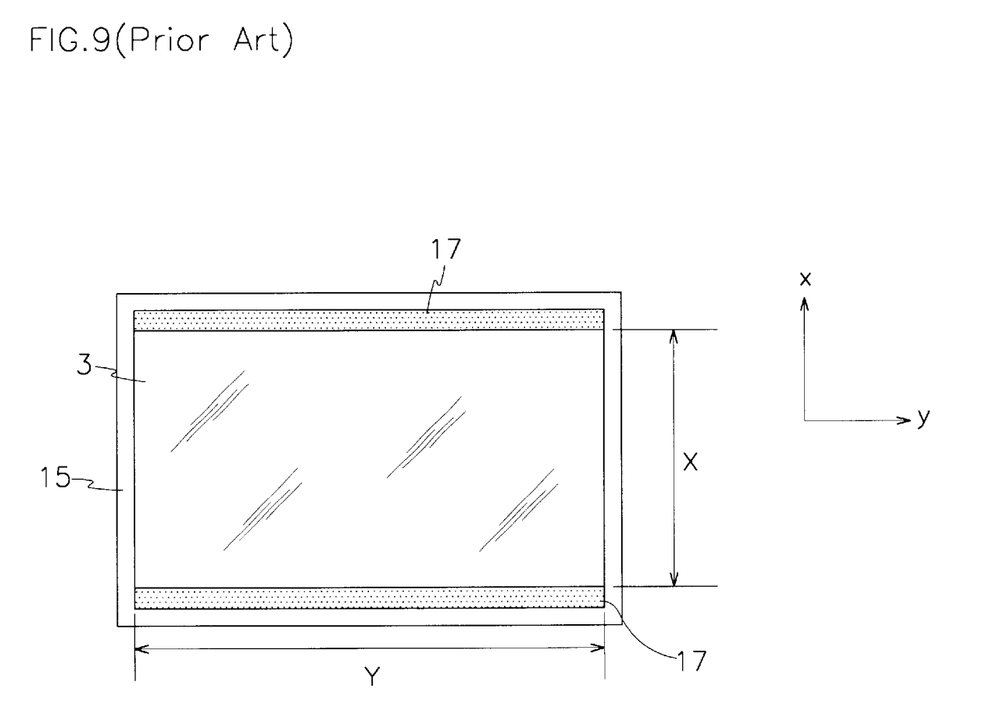
FIG. 9 shows a top plan view of a bottom plate of the touch panel device according to the prior art.

As shown in FIG. 9, the lower conductive layer 3, which has an active area, is formed on the bottom plate 15. The conductive layer 3 has a pair of electrodes 17 disposed on its edges to be opposed in an X direction. A driving voltage is applied to the electrodes 17. Although the upper conductive layer 1 is not shown in the drawing, it is the same size as the lower conductive layer 3 and is formed on the top plate. The upper conductive layer also has a pair of electrodes disposed on its edges to be opposed in an Y direction.

The resistance R between the electrodes of the conductive layer is determined by a sheet resistance as well as an aspect ratio of the layer, as expressed in the following formula 1:

$$R = Ro \times (x/y) \quad \text{[Formula 1]}$$

Where Ro represents a sheet resistance of a conductive layer, expressed in units of $\Omega$ or $\Psi/\square$, (x/y) represents an aspect ratio of a conductive layer since x and y represent lengths of the conductive layer in X and Y directions, respectively.

The sheet resistance Ro is inherently determined by the material of the layer while the aspect ratio is determined by a design of the layer dimensions. Accordingly, the resistance between the electrodes is also to be determined with respect to a fixed value by the material and design of the conductive layer.

However, there has been needs to have the resistance values of various ranges since various circuit configurations are used for specific applications. In order to adjust the resistance value to meet the needs, additional heat treatment processes are generally used before and/or after the etching process of the conductive layer.

The additional heat treatment processes, however, increase the number of manufacturing processes as well as the processing time. They also require expensive manufacturing facilities.

Further, the heat treatment processes cause excessive uneven distribution of conductive layers, thereby deteriorating manufacturing yields and quality of the touch panel devices.

SUMMARY OF THE INVENTION

In view of the prior art described above, it is an object of the present invention to provide a touch panel device of which the conductive layer has various ranges of resistance values as adapted for specific applications.

It is another object of the present invention to provide a touch panel device which is adapted for having a wide-range resistance value without any additional manufacturing process which may produce uneven distribution of a conductive layer.

To achieve these and other objects, as embodied and broadly described herein, the invention comprises a top plate and a base plate;

a upper conductive layer, formed on the top plate, having a pair of first electrodes disposed on its edges to be opposed in a first direction, the first electrodes being applied by a driving voltage;

a lower conductive layer, formed on the base plate, having a pair of second electrodes disposed on its edges to be opposed in a second direction normal to the first direction, the second electrodes being applied by a driving voltage;

a plurality of dot spacers, located in between said upper conductive layer and lower conductive layer, the upper conductive layer and the lower conductive layer facing each other with a certain specified clearance therebetween; the dot spacers made of an elastic material; and a controller for detecting a coordinate signal of a position on which the upper conductive layer and the lower conductive layer are contacted with each other by an external pressure, wherein a plurality of through holes are formed on at least either one of the upper conductive layer and the lower conductive layer, so that a resistance between the electrodes can be varied by varying dimensions of the through holes and intervals between the through holes.

The resistance between the electrodes has a value which is around an ideal resistance determined by the following conditions:

$$R = Y \times Ro/(n \times W)$$

$$n = X/(W+T)$$

where

Ro represents a sheet resistance of a conductive layer;

X represents a length of each electrode;

Y represents a distance between the electrodes;

T represents a dimension of each through hole; and

W represents an interval between the adjacent through holes.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION OF THE PREFERRED EMBODIMENTS

The present invention will be described in detail with reference to the accompaying drawings.

Figure 1:
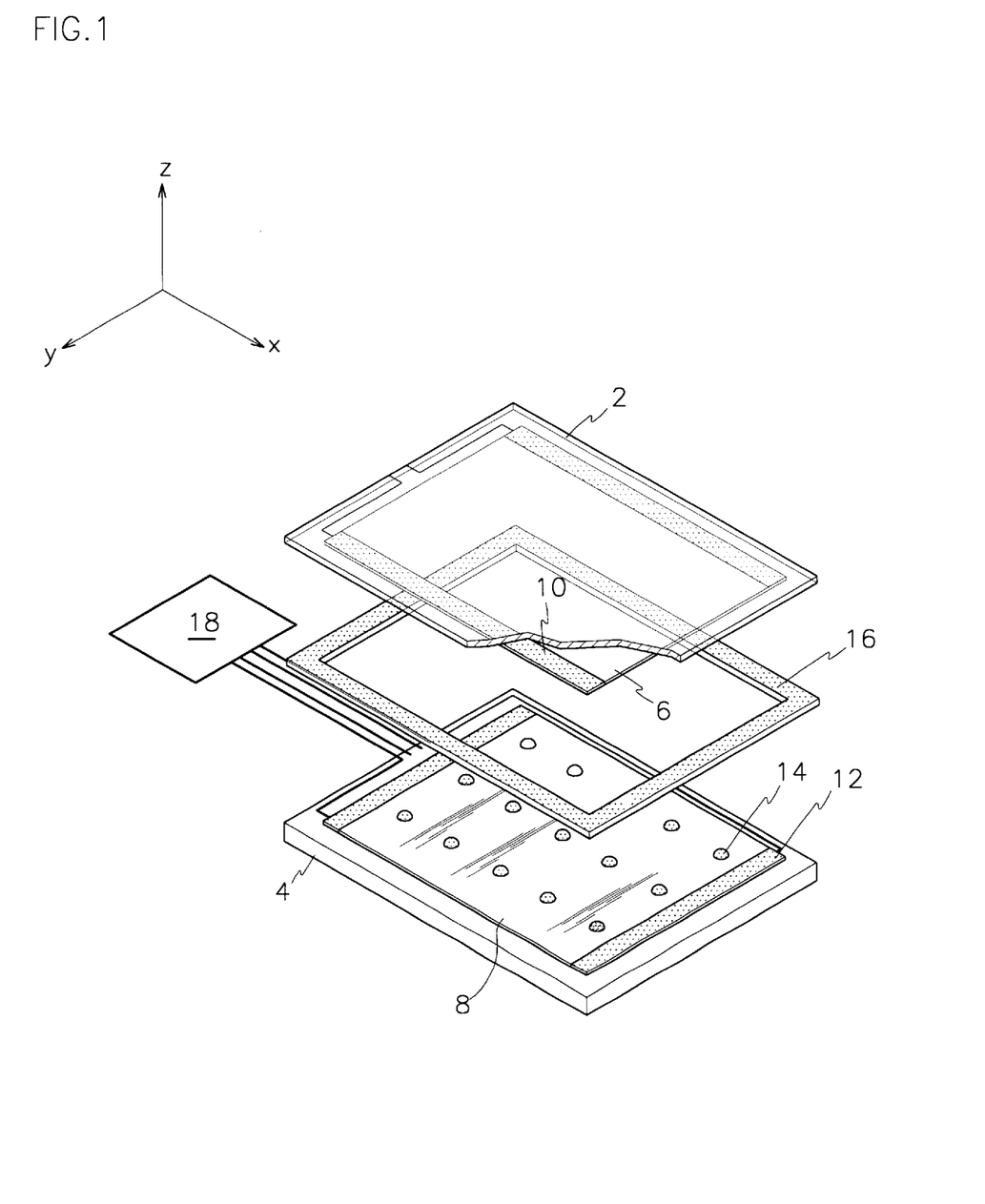
FIG. 1 shows an exploded perspective view of a touch panel device according to the present invention.

Referring to FIG. 1, a touch panel device according to the present invention comprises a pair of transparent plates, i.e., a top plate 2 and a base plate 4. A pair of transparent conductive layers composed of an upper conductive layer 6 and a lower conductive layer 8 are disposed to be opposite each other with a certain gap therebetween. The upper conductive layer 6 is provided with a pair of first electrodes 10 disposed on its edges to be opposed in an X direction. The lower conductive layer 8 is provided with a pair of second electrodes 12 disposed on its edges to be opposed in a Y direction which is perpendicular to the X direction.

The top plate 2 is typically formed of a transparent synthetic resin such as polyethylene terephthalate film. Further, the top plate 2 may have a high hardness coating on the surface on which the upper conductive layer is not formed, in order to avoid damage of the surface. Alternatively, the top plate 2 may have an embossing coating on the surface in order to minimize reflection from the surface.

The base plate is typically formed of glass to oppose a display device such as an LCD or CRT.

A plurality of dot spacers 14 are located in between the upper conductive layer 6 and the lower conductive layer 8, so that the upper conductive layer 6 and the lower conductive layer 8 face each with a certain specified clearance therebetween. The dot spacers 14 are made of an elastic material. The top plate 2 and base plate 4 are attached to each other by an adhesive 16.

The touch panel device further comprises a controller 18 for detecting a coordinate signal of a position on which the upper conductive layer and the lower conductive layer are contacted with each other by an external pressure such as a pen or finger. That is, the first electrodes 10 are supplied with a first driving voltage by a driving circuit of the controller 18, and then apply a constant current across the upper conductive layer 6 in the X direction. Similarly, the second electrodes 12 are supplied with a second driving voltage, and then apply a constant current across the lower conductive layer 8 in the Y direction.

Therefore, when a user applies a pressure on a specific position with a finger or a pen, the upper conductive layer 6 is contacted with the lower conductive layer 8 to effect an electrical switching. When a specific position is electrically switched, a controller 18 detects x and y coordinates of the position, and then generates digital coordinate signals.

According to the novel feature of the present invention, the resistance between the electrodes is adapted for specific applications. The touch panel device has at least either of the conductive layers having a plurality of through holes.

Figure 2:
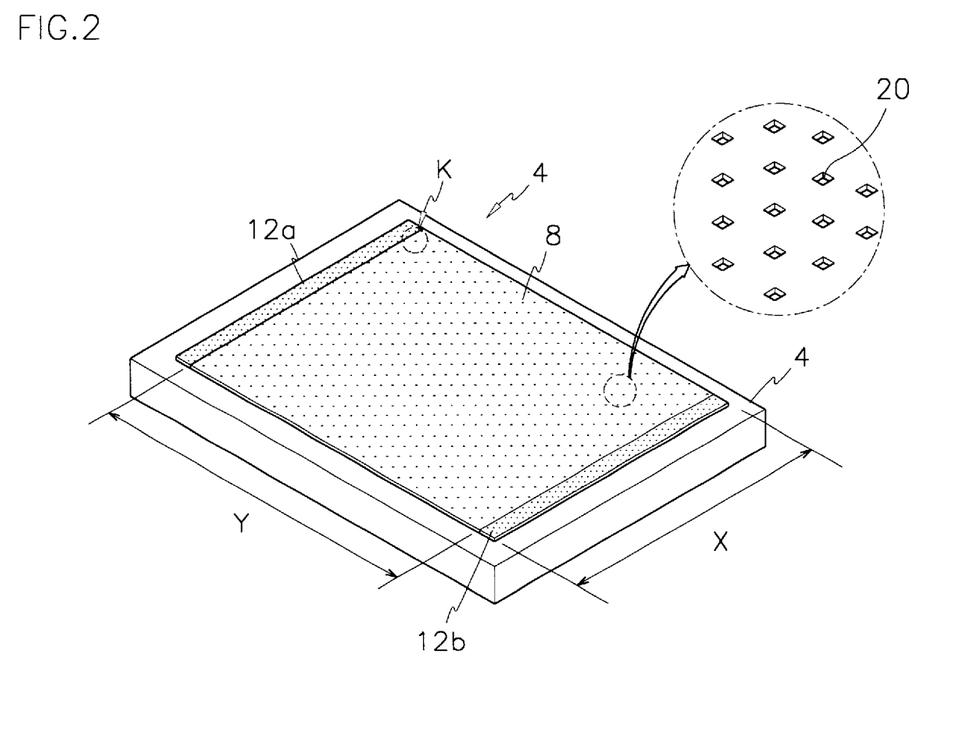
FIG. 2 shows a perspective view of a base plate of the touch panel according to the present invention.

Referring to FIG. 2, the base plate 4 is provided with the lower conductive layer 8 having a plurality of through holes 20. The through holes 20 are disposed in a constant interval.

Each of the through holes 20 have small dimensions so that the through holes do not affect the conduction characteristics of the lower conductive layer 8. Further, the dimensions of each hole are preferably smaller than the typical diameter of a pen tip, for example 0.8 mm, since the upper conductive layer 6 and the lower conductive layer 8 need to be always contacted when a user presses the touch panel device with a pen or a finger.

The pair of second electrodes 12 is shown including an electrode 12a which is connected with a power source (not shown) to be supplied a bias voltage, and a ground electrode 12b which is grounded.

Figure 3:
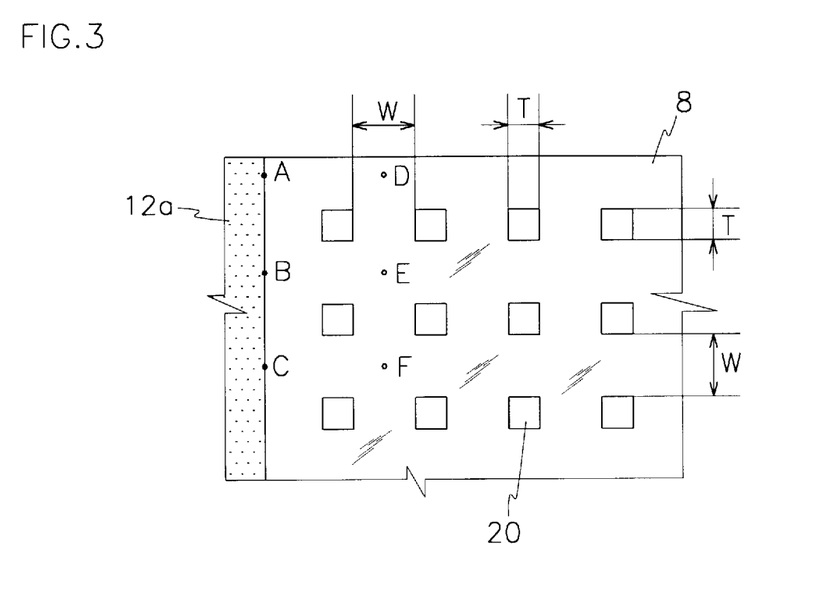
FIG. 3 shows an enlarged plan view of section K of FIG. 2.

FIG. 3 shows enlarged section K of the lower conductive layer shown in FIG. 2, including the electrode 12a. Each of the though holes 20 is shaped in a square having a width T and spaced from the adjacent holes at an interval W, in both X and Y directions. Although the through holes 20 are shaped in squares as shown in FIG. 2 or FIG. 3, it is possible to form through holes in other shapes such as circles or rectangles, etc.

Figure 4:
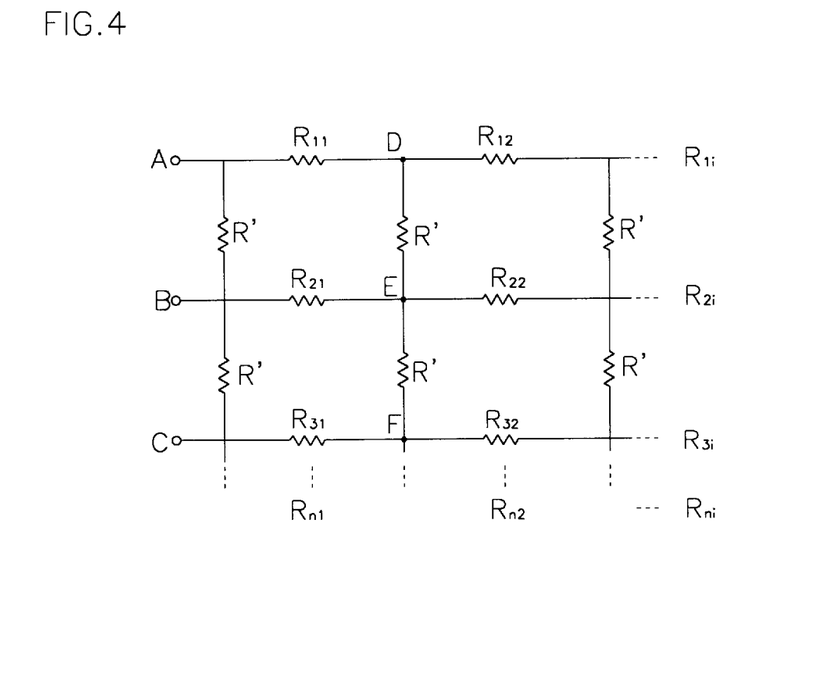
FIG. 4 is a theoretical circuit diagram illustrating the resistor configuration of FIG. 3.

FIG. 4 is a theoretical circuit diagram illustrating the resistor configuration of FIG. 3, corresponding to each of the positions A–F. The resultant resistance R of the layer between the electrodes are obtained as follows:

Positions A, B and C have the same potential which is the bias voltage. Assuming a constant sheet resistance Ro of the conductive layer, the positions D, E and F, which are spaced at the same distance from the electrode 12a, and they also have the same electrical potential. Therefore, resistance R' between two positions such as D–E or E–F, which are spaced at the same distance from the electrode, is negligible.

The resistors in each row are connected each other in series, resulting in low resistance Ra. Further, the combined resistors in a row having low resistance Ra are connected in parallel with the resistors in other rows.

That is, the row resistance Ra is calculated by the following formula 2.

$$Ra = R_{11} + R_{12} + \ldots + R_{1i} \quad\quad \text{[Formula 2]}$$
$$= R_{21} + R_{22} + \ldots + R_{2i}$$
$$= R_{n1} + R_{n2} + \ldots + R_{ni}$$

The resultant resistance R is calculated by the number n of the resistors, each having resistance Ra, and they are in parallel connection with each other. That is, the following formula 3 provides the resultant resistance R.

$$R = \frac{1}{\frac{1}{Ra} + \frac{1}{Ra} + \ldots + \frac{1}{Ra}} = \frac{1}{\sum_{k=1}^{n} \frac{1}{Ra}} = \frac{1}{n} \times Ra \quad \text{[Formula 3]}$$

$$R = \frac{1}{\frac{1}{\frac{Y}{W} \times Ro} + \frac{1}{\frac{Y}{W} \times Ro} + \ldots + \frac{1}{\frac{Y}{W} \times Ro}} \quad \text{[Formula 4]}$$

$$= \frac{1}{\sum_{k=1}^{n} \frac{W}{Y \times Ro}} = \frac{1}{n} \times \frac{Y}{W} \times Ro$$

where n is expressed by the following formula 4.

$$n = \frac{X}{W + T} \quad \text{[Formula 5]}$$

(to raise fractions to a unit.)
where X represents a length of the electrode, Y represents a distance between the electrodes.

As shown in formulas 3 and 4, the resultant resistance R between the electrodes 12a, 12b depends on the width T of each through hole and the intervals W between the through holes, rather than a sheet resistance or an aspect ratio of the layer.

Therefore, the touch panel according to the present invention allows for varying the resistance of a conductive layer between a pair of electrodes for the specific applications by varying dimensions and intervals of the through holes.

Figure 5:
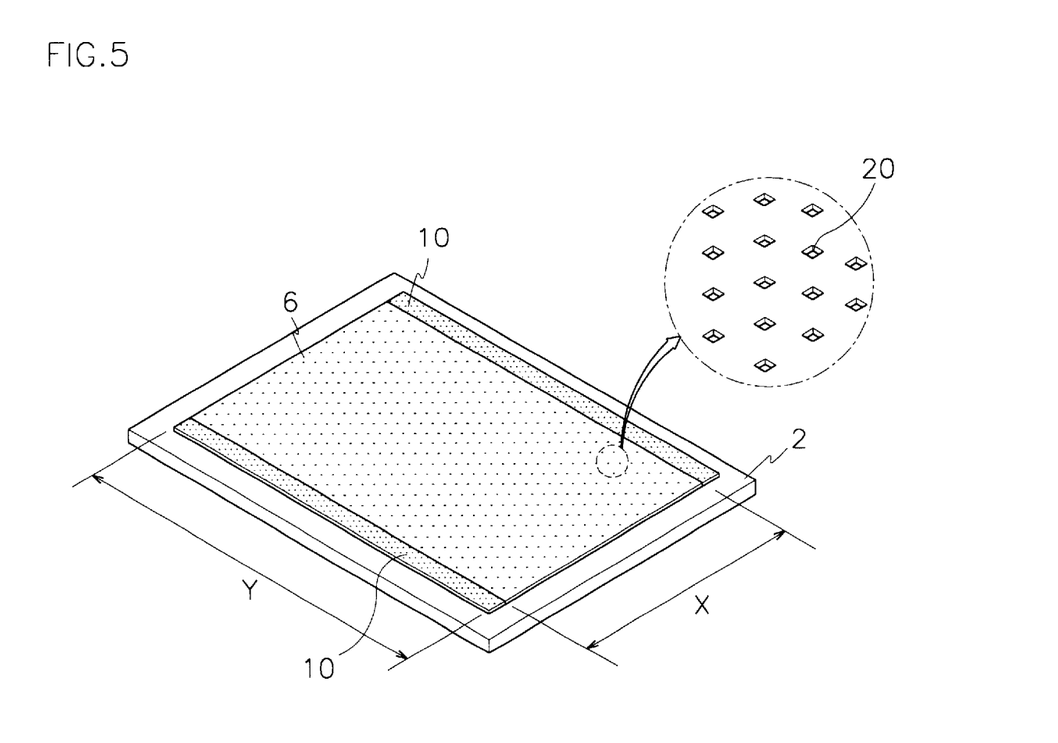
FIG. 5 shows a perspective view of a top plate of the touch panel according to the present invention.

Referring to FIG. 5, another embodiment of the present invention is illustrated. In this embodiment, the upper conductive layer 6 is provided with a plurality of through holes 20. The through holes 20 are disposed in a constant interval. It also is possible to provide a plurality of through holes to both the upper conductive layer 6 and the lower conductive layer 8, in order to vary each resistance of the layers 6 and 8 for specific applications.

Figure 6:
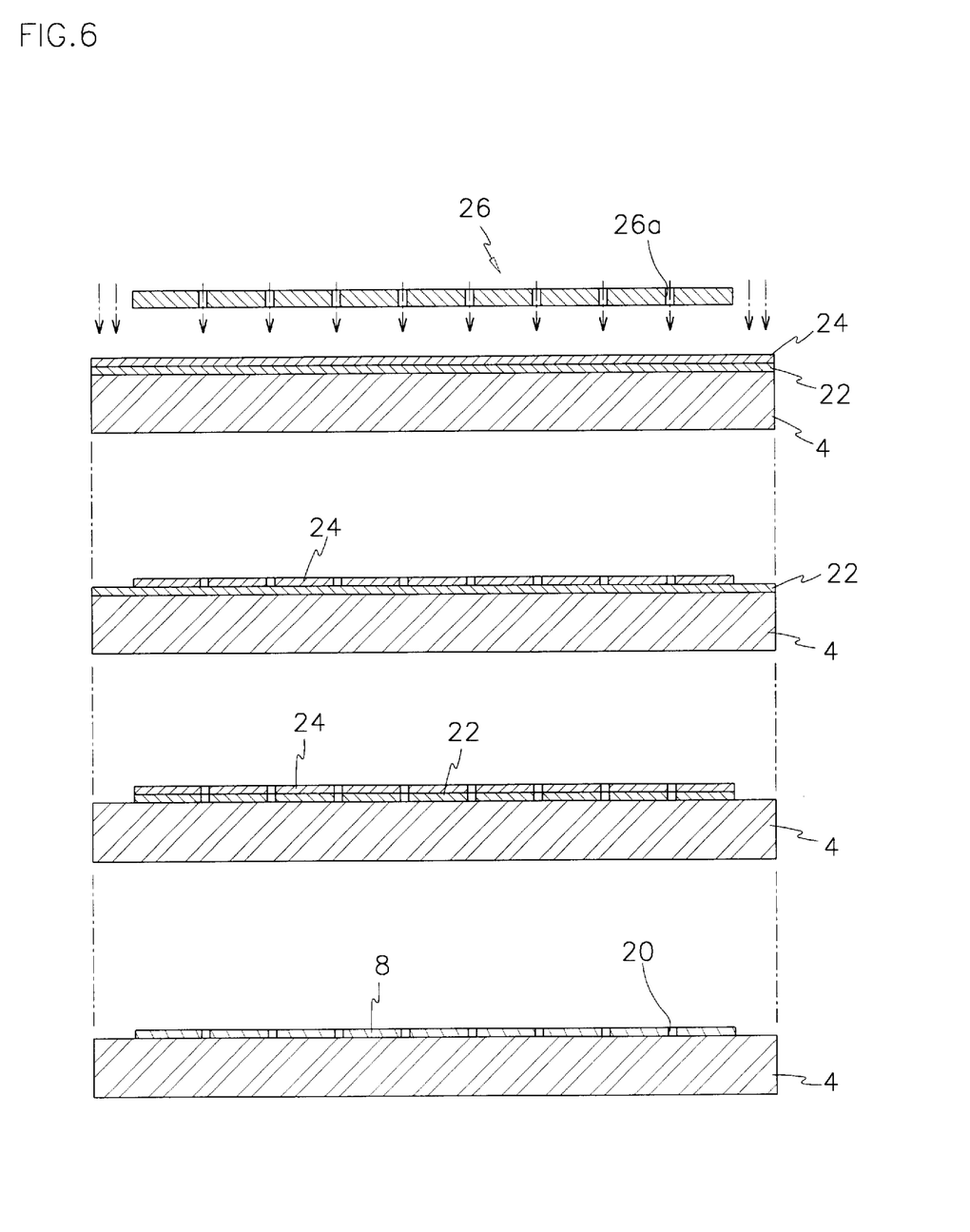
FIG. 6 is a schematic diagram for manufacturing a conductive layer having through holes.

The through holes 20 are relatively easily formed on the conductive layer during forming of the conductive layer, without additional manufacturing processes. Referring now to FIG. 6, the manufacturing of through holes will be described in detail.

First, a conductive layer 22 such as indium tin oxide (ITO) is formed on the base plate 4 and photoresist 24 is coated on the conductive layer 22. Then, the plate is exposed to a lamp (not shown) with a mask 26. The mask has a edge shape which is desirable to a general conductive layer as well as a plurality of holes 26a corresponding to the through holes 20.

Then, an exposing process using a lamp (not shown) and a developing process are sequentially performed to remove the exposed portions including edges of the conductive layer and the holes.

Next, the plate is etched by an appropriate echant and the residual photoresist 24 is removed to complete the conductive layer 8.

Therefore, the conductive layer of the present invention is formed by a conventional manufacturing process using a mask which further comprises a plurality of holes. That is, the touch panel according to the present invention is adapted for adjusting resistance while minimizing uneven distribution, without any additional manufacturing processes.

The experimental results of the inventor of the present invention are shown in Table 1 below. The experimental conditions are as follows: The resistance is calculated and measured for a model PT029001A. The length of each electrode is 70.0 mm and the distance between the electrodes is 33.7 mm. The resistance $R_{conv}$ of the right column is measured for a model PT029001A having a conventional conductive layer. The experimental conditions are the same for the present invention and the conventional model except for the through holes. The through holes are formed on the lower conductive layer varying the width T and interval W. The $R_{ideal}$ is a calculated value while the $R_{mea}$ is a measured value while varying the conditions of T and W. $R_{diff}$ represents a difference between the ideal resistance and the measured resistance.

TABLE 1

| | Through hole | | Test result | | | | $R_{conv}$ |
|---|---|---|---|---|---|---|---|
| | T (mm) | W (mm) | $R_{ideal}$ (Ω) | $R_{mea}$ (Ω) | $R_{diff}$ (Ω) | Distribution | (Ω) |
| 1 | 0.1 | 0.1 | 472 | 410 | −62 | 5.9 | 261 |
| 2 | 0.1 | 0.2 | 353 | 300 | −53 | 3.0 | |
| 3 | 0.2 | 0.2 | 469 | 408 | −61 | 7.1 | |
| 4 | 0.2 | 0.1 | 711 | 645 | −66 | 7.6 | |
| 5 | 0.1 | 0.15 | 394 | 339 | −55 | 9.2 | |
| 6 | 0.2 | 0.05 | 1179 | 1129 | −50 | 12.7 | |
| 7 | 0.25 | 0.25 | 472 | 405 | −67 | 4.1 | |
| 8 | 0.25 | 0.15 | 632 | 554 | −78 | 4.0 | |
| 9 | 0.15 | 0.1 | 589 | 519 | −70 | 5.7 | |
| 10 | 0.1 | 0.15 | 394 | 337 | −57 | 5.0 | |
| 11 | 0.1 | 0.1 | 472 | 368 | −104 | 28.0 | |

Figure 7:
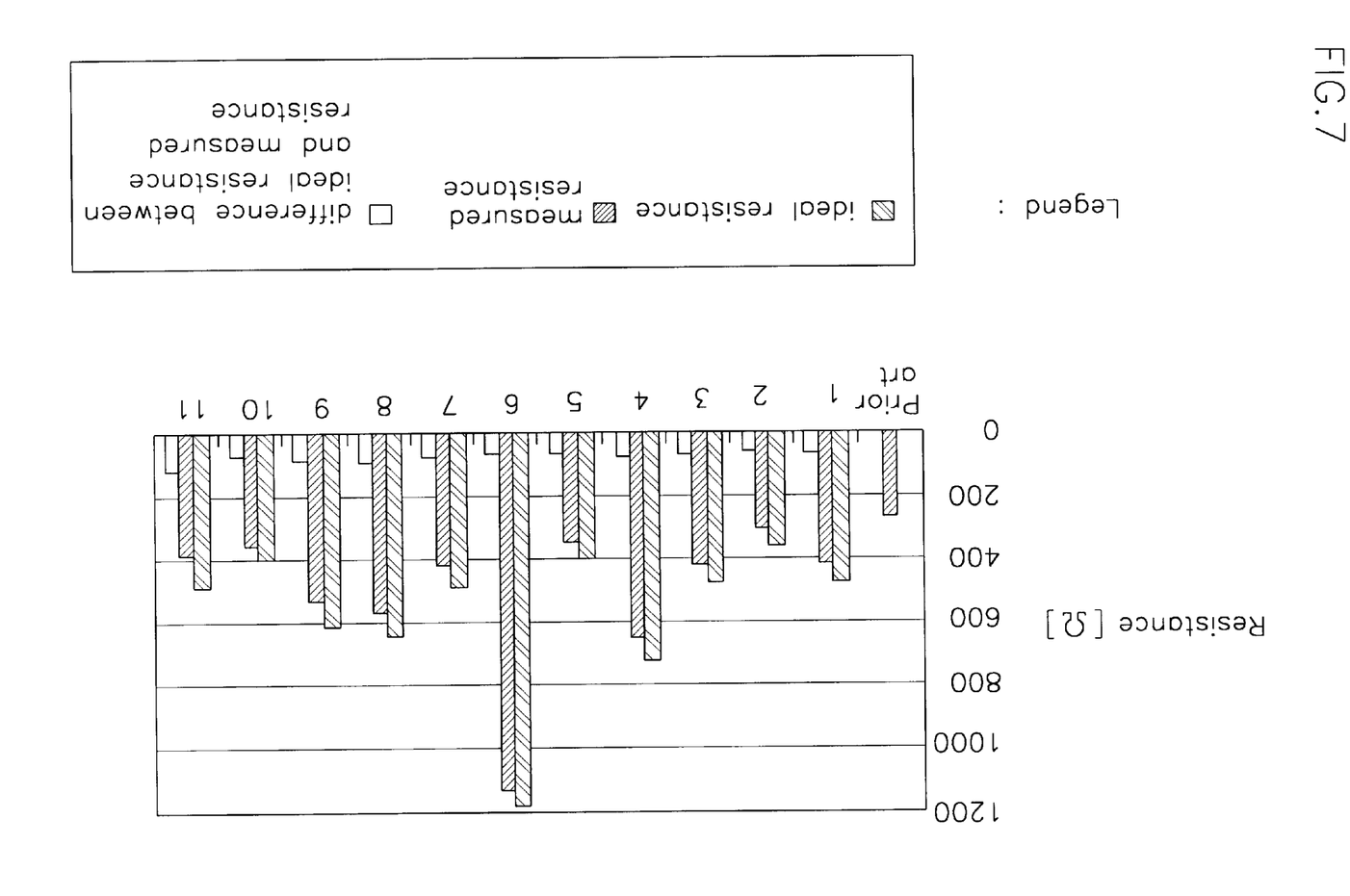
FIG. 7 is a graph showing values of the ideal resistance and measured resistance according to the present invention.

FIG. 7 shows a graph illustrating resistance of the experimental result of Table 1. As shown in Table 1 and FIG. 7, the resistance of the lower conductive layer in a touch panel device according to the present invention is greater than that of the conventional conductive layer. It should be also noted that the conductive layer has a wide range of resistance by varying a width T of each through hole and interval W between the through holes.

In the number 11 of Table 1, the through holes have shapes of circles. The difference $R_{diff}$ between the ideal resistance and the measured resistance are relatively large since the ideal resistance is calculated for a square model. Other measured resistances of numbers 1–10, however, are close to the ideal resistances.

It is noted that the differences $R_{diff}$ have values around 50 Ω, independent of the dimensions of the through holes. It appears that this results from the assumption of the constant sheet resistance Ro. That is, the combinations of actual distribution of the sheet resistance, which is neglected in the formulas 2–4, and the actual deviations of the width of each through hole drop the resistances.

It is also noted that the resistance between the electrodes increases with increases of the width T of the through hole and the interval W between the through holes, rather than the number or total areas of the through holes.

This configuration is effective in varying the resistance for specific applications without additional manufacturing processes.

It will be apparent to those skilled in the art that various modifications and variations can be made to the device of the present invention without departing from the spirit and scope of the invention. The present invention covers the modifications and variations of this invention provided they come within the scope of the appended claims and their equivalents.

What is claimed is:

1. A touch panel comprising:

a top plate and a base plate;

a upper conductive layer, formed on the top plate, having a pair of first electrodes disposed on its edges to be opposed in a first direction, the first electrodes being applied by a driving voltage;

a lower conductive layer, formed on the base plate, having a pair of second electrodes disposed on its edges to be opposed in a second direction normal to the first direction, the second electrodes being applied by a driving voltage;

a plurality of dot spacers, located in between said upper conductive layer and lower conductive layer, the upper conductive layer and the lower conductive layer facing each other with a certain specified clearance therebetween, the dot spacers made of an elastic material; and a controller for detecting a coordinate signal of a position on which the upper conductive layer and the lower conductive layer are contacted with each other by an external pressure, wherein a plurality of through holes are formed on at least either one of the upper conductive layer and the lower conductive layer, so that a resistance between the electrodes can be varied by varying dimensions of the through holes and intervals between the through holes.

2. The touch panel device as recited in claim 1, wherein the plurality of through holes are formed on the upper conductive layer.

3. The touch panel device as recited in claim 1, wherein the plurality of through holes are formed on the lower conductive layer.

4. The touch panel device as recited in claim 1, wherein the plurality of through holes are formed on both the upper conductive layer and the lower conductive layer.

5. The touch panel device as recited in claim 1, wherein the resistance between the electrodes has a value which is around an ideal resistance determined by the following conditions:

$$R = Y \times Ro/(n \times W)$$

$$n = X/(W+T)$$

where

Ro represents a sheet resistance of a conductive layer;

X represents a length of each electrode;

Y represents a distance between the electrodes;

T represents a dimension of each through hole; and

W represents an interval between the adjacent through holes.

6. The touch panel device as recited in claim 1, wherein the conductive layer on which the plurality of through holes are formed by photolithography processes with a mask having a plurality of holes corresponding to the plurality of though holes.

* * * * *